US011077424B2

(12) United States Patent
Sugimoto et al.

(10) Patent No.: US 11,077,424 B2
(45) Date of Patent: Aug. 3, 2021

(54) OXYGEN SCAVENGER COMPOSITION

(71) Applicant: MITSUBISHI GAS CHEMICAL COMPANY, INC., Tokyo (JP)

(72) Inventors: Ken Sugimoto, Tokyo (JP); Yoshinobu Miyabe, Tokyo (JP); Shinichi Ikeda, Tokyo (JP); Kouta Kagimoto, Tokyo (JP); Ryoujyu Narikawa, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 178 days.

(21) Appl. No.: 16/086,401

(22) PCT Filed: Jan. 24, 2017

(86) PCT No.: PCT/JP2017/002333
§ 371 (c)(1),
(2) Date: Sep. 19, 2018

(87) PCT Pub. No.: WO2017/169015
PCT Pub. Date: Oct. 5, 2017

(65) Prior Publication Data
US 2019/0083955 A1    Mar. 21, 2019

(30) Foreign Application Priority Data

Mar. 30, 2016  (JP) .............................. JP2016-068607

(51) Int. Cl.
*B01J 20/28* (2006.01)
*B01D 53/14* (2006.01)
(Continued)

(52) U.S. Cl.
CPC ........ *B01J 20/28019* (2013.01); *B01D 53/14* (2013.01); *B01J 20/02* (2013.01); *B01J 20/0229* (2013.01); *B01J 20/14* (2013.01); *B01J 20/20* (2013.01); *B01J 20/28* (2013.01); *B01J 20/28004* (2013.01); *B01D 2252/10* (2013.01);
(Continued)

(58) Field of Classification Search
CPC .. B01J 20/28019; B01J 20/02; B01J 20/0229; B01J 20/14; B01J 20/20; B01J 20/28; B01J 20/28004; B01D 53/14
See application file for complete search history.

(56) References Cited

U.S. PATENT DOCUMENTS

2009/0159846 A1* 6/2009 Sugimoto ............ B01J 20/3035
252/188.28

FOREIGN PATENT DOCUMENTS

CN   101423880 A   5/2009
JP   5-168842      7/1993
(Continued)

OTHER PUBLICATIONS

Official Communication issued in International Bureau of WIPO Patent Application No. PCT/JP2017/002333, dated Mar. 14, 2017.

*Primary Examiner* — James A Fiorito
(74) *Attorney, Agent, or Firm* — Greenblum & Bernstein, P.L.C.

(57) ABSTRACT

The present invention provides an oxygen scavenger composition comprising a granule having: an α layer containing a water retention agent, a swelling agent, a metal salt and water; a β layer containing iron; and a γ layer containing a porous support, wherein the granule forms a layer structure in order of the α layer, the β layer and the γ layer from an inside to an outside of the granule.

7 Claims, 1 Drawing Sheet

(51) Int. Cl.
*B01J 20/02* (2006.01)
*B01J 20/14* (2006.01)
*B01J 20/20* (2006.01)
*B01J 20/30* (2006.01)

(52) U.S. Cl.
CPC ..... *B01D 2257/104* (2013.01); *B01J 20/3028* (2013.01); *B01J 2220/42* (2013.01)

(56) References Cited

FOREIGN PATENT DOCUMENTS

| | | |
|---|---|---|
| JP | 5-237374 | 9/1993 |
| JP | 9-117659 | 5/1997 |
| JP | 2007-144410 | 6/2007 |
| JP | 2008-126172 | 6/2008 |
| JP | 2008-264665 | 11/2008 |
| JP | 2011-57265 | 3/2011 |
| JP | 4821692 B | 11/2011 |
| JP | 2013-147556 | 8/2013 |
| TW | 200730242 A | 8/2007 |
| WO | 2007/046449 | 4/2007 |

\* cited by examiner

[Figure 1]
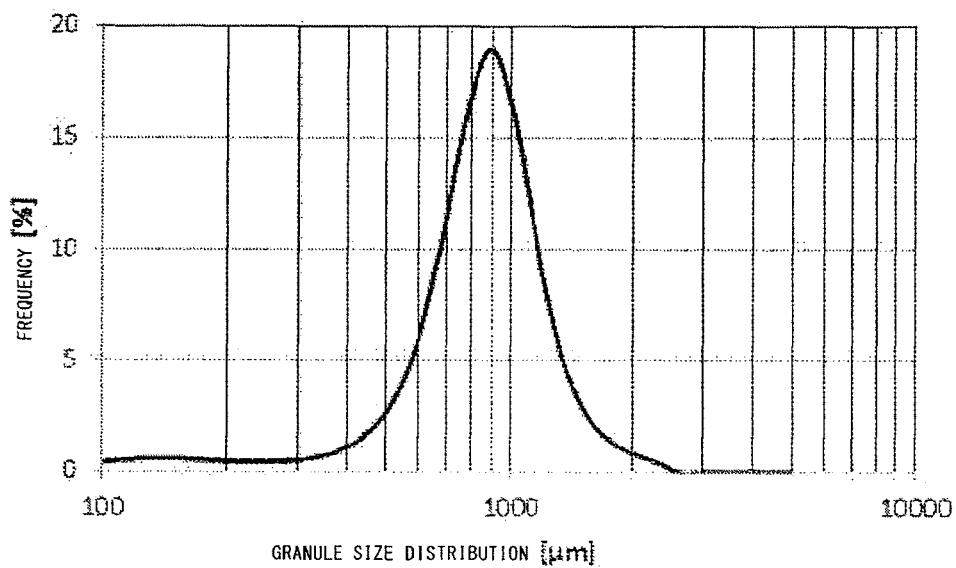
[Figure 2]
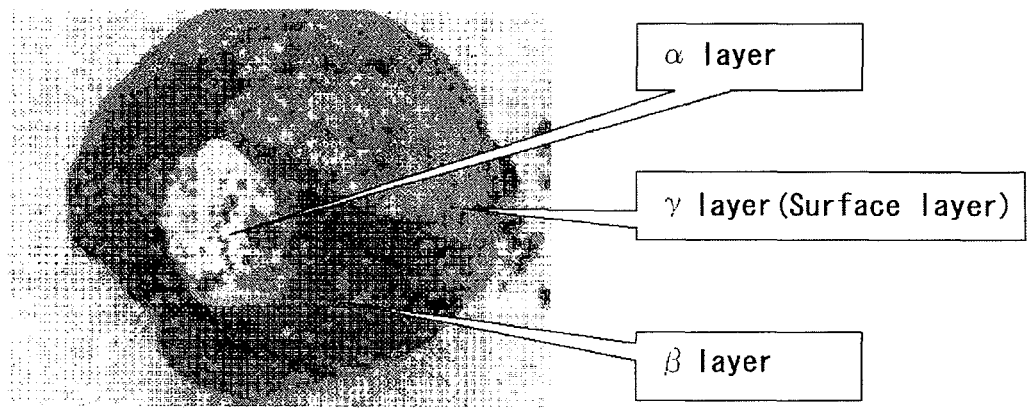

OXYGEN SCAVENGER COMPOSITION

TECHNICAL FIELD

The present invention relates to an oxygen scavenger composition.

BACKGROUND ART

An oxygen scavenger in the form of, for example, a small bag, which is obtained by filling an air-permeable packaging material with an oxygen scavenger composition containing granules, is used for inhibiting oxidative deterioration of foods, medicines, etc. and thereby preserving them. This oxygen scavenger needs various functions in accordance with the properties of foods or medicines to be preserved. As one of them, an oxygen scavenger that is small-sized and absorbs a large amount of oxygen is required. In other words, an oxygen scavenger composition having a large amount of oxygen absorbed per unit volume is required.

Here, iron powder is generally used for an oxygen scavenger as a substance that absorbs oxygen (oxygen absorbing substance). In order to absorb oxygen, the iron powder needs moisture. In a conventional oxygen scavenger containing iron powder and water, the iron powder and a water retention agent retaining water for supplying moisture are contained as different granules that are separable from each other. On that account, a gap occurs between the granule of the iron powder and that of the water retention agent, and the gap contributes to a decrease in the amount of oxygen absorbed by an oxygen scavenger composition per unit volume. Moreover, with regard to the iron powder and the water retention agent, the iron powder particles or the water retention agent particles gather are bonded and easily become agglomerates. If the iron powder becomes agglomerates, the surface area of the oxidizable iron powder is reduced, and therefore, there is a problem that the amount of oxygen absorbed decreases as compared with a case where the iron powder and the water retention agent are homogeneously dispersed and mixed with each other.

In, for example, Patent Literature 1, an oxygen scavenger composition containing an oxygen absorbing substance, water and a swelling agent and having been decreased in volume to achieve compactification by being solidified through pressure molding and thereby removing gaps among the granules is disclosed.

CITATION LIST

Patent Literature

Patent literature 1: International Publication No. WO 2007/046449

SUMMARY OF INVENTION

Technical Problem

However, the production cost of such an oxygen scavenger composition as described in Patent Literature 1 increases because a step of pressure molding is newly required as compared with an oxygen scavenger composition capable of being produced by mixing only. Moreover, the fluidity of the above oxygen scavenger composition is lowered because the swelling agent is present also on the surfaces of the granules. In addition, iron powder present more inside the granules is more difficult to oxidize, and therefore, there is still room for improvement in the amount of oxygen absorbed per unit volume.

Accordingly, it is an object of the present invention to provide an oxygen scavenger composition having an excellent level of an amount of oxygen absorbed per unit volume.

Solution to Problem

In order to solve the problem associated with the prior art, the present inventors have made studies, and as a result, they have found that an oxygen scavenger composition containing granules each having an α layer containing a water retention agent, a swelling agent, a metal salt and water, a β layer containing iron, and a γ layer containing a porous support, wherein each of the granules forms a layer structure in order of the α layer, the β layer and the γ layer from the inside to the outside of the granule has an excellent level of an amount of oxygen absorbed per unit volume, and have accomplished the present invention. That is to say, the present invention is as follows.

[1]
An oxygen scavenger composition comprising a granule comprising:
an α layer comprising a water retention agent, a swelling agent, a metal salt and water;
a β layer containing iron; and
a γ layer containing a porous support,
wherein the granule forms a layer structure in order of the α layer, the β layer and the γ layer from an inside to an outside of the granule.

[2]
The oxygen scavenger composition according to [1], wherein the water retention agent comprises one or more selected from the group consisting of diatomaceous earth, silica and activated carbon.

[3]
The oxygen scavenger composition according to [1] or [2], wherein the swelling agent comprises one or more selected from the group consisting of carboxymethylcellulose calcium, carboxymethylcellulose sodium, calcium bentonite and sodium bentonite.

[4]
The oxygen scavenger composition according to any one of [1] to [3], wherein the granule comprises the α layer in an amount of 30% by mass or more and 50% by mass or less, the β layer in an amount of 49% by mass or more and 69% by mass or less, and the γ layer in an amount of 0.1% by mass or more and 5.0% by mass or less, based on a total amount of the granule.

[5]
The oxygen scavenger composition according to any one of [1] to [4], wherein the α layer contains the swelling agent in an amount of 1.0% by mass or more and 10% by mass or less, based on a total amount of the α layer.

Advantageous Effects of Invention

According to the oxygen scavenger composition of the present invention, the amount of oxygen absorbed per unit volume can be increased to an excellent level.

BRIEF DESCRIPTION OF DRAWINGS

FIG. 1 shows a view showing a granule size distribution of an oxygen scavenger composition of Example 1.

FIG. 2 shows a sectional photograph of an oxygen scavenger composition of Example 1.

DESCRIPTION OF EMBODIMENTS

An embodiment to carry out the present invention (referred to as "present embodiment" hereinafter) is described in detail hereinafter. The present embodiment below is an example to explain the present invention, and does not support that the present invention is limited to the following contents. The present invention can be appropriately modified and carried out within the scope of its spirit.

The oxygen scavenger composition of the present embodiment contains granules each having an α layer containing a water retention agent, a swelling agent, a metal salt and water (also referred to as an "α layer" simply hereinafter), a β layer containing iron (also referred to as a "β layer" simply hereinafter), and a γ layer containing a porous support (also referred to as a "γ layer" simply hereinafter). Here, in the oxygen scavenger composition of the present embodiment, the iron and the water retention agent are not separated as different granules differently from those in a conventional oxygen scavenger composition, and they are integrally incorporated as a layer structure of the α layer containing the water retention agent and the β layer containing iron. Each of the granules forms a layer structure in order of the α layer, the β layer and the γ layer from the inside to the outside of the granule. The amount of oxygen absorbed by the oxygen scavenger composition of the present embodiment per unit volume is large.

Each of the granules contained in the oxygen scavenger composition of the present embodiment forms a layer structure in order of the α layer (inside), the β layer and the γ layer (outside) from the inside to the outside of the granule. The amount of oxygen absorbed by the oxygen scavenger composition of the present embodiment per unit volume is large. A factor for this is presumed as follows (and not limited thereto). Since each of the granules in the oxygen scavenger composition of the present embodiment mainly forms a layer structure in order of the α layer containing a water retention agent and the β layer containing iron (also referred to as "α layer/β layer/γ layer" hereinafter), the β layer containing iron is adjacent to the outside of the α layer containing a water retention agent for supplying moisture, whereby iron rapidly undergoes oxidation reaction, and the oxidation reaction ratio between iron and oxygen is also enhanced. Further, since the γ layer containing silicas is adjacent to the outside of the β layer, slip properties of the granules are improved, and the granules are densely packed. Owing to this, the bulk density of the oxygen scavenger composition increases, and the amount of oxygen absorbed by the oxygen scavenger composition per unit volume increases.

Here, the expression "layer structure in order of the α layer, the β layer and the γ layer" refers to a structure in which the β layer and the α layer are formed inside a void of the γ layer and the α layer is formed inside a void of the β layer. Therefore, not only a structure in which the surfaces of the β layer and the α layer are covered with the γ layer but also a structure in which a part of the interior of a void of a three-dimensional network structure formed of the γ layer is filled with the β layer and the α layer is included. Likewise, not only a structure in which the surface of the α layer is covered with the β layer but also a structure in which a part of the interior of a void of a three-dimensional network structure formed of the β layer is filled with the α layer is also included. Consequently, in the "layer structure in order of the α layer, the β layer and the γ layer" in the present specification, a granule in which boundaries between the α layer, the β layer and the γ layer are not strictly clear is also included. Moreover, the granule of the present embodiment may further have a layer other than the α layer, the β layer and the γ layer. The oxygen scavenger composition of the present embodiment has only to contain a granule which forms a "layer structure in order of the α layer, the β layer and the γ layer", and may further contain a granule which does not form a "layer structure in order of the α layer, the β layer and the γ layer". Needless to say, the oxygen scavenger composition of the present embodiment may be an oxygen scavenger composition composed of only granules each of which forms a "layer structure in order of the α layer, the β layer and the γ layer".

Examples of shapes of the granules of the present embodiment include, but not particularly limited to, spherical, elliptical and cylindrical shapes. Preferable is spherical shape because granules of spherical shape tend to have more excellent filling properties and higher bulk density.

The mean granule diameter of the oxygen scavenger composition is preferably 0.3 mm or more and 5.0 mm or less, more preferably 0.5 mm or more and 2.0 mm or less. Since the mean granule diameter is 0.3 mm or more, adhesion of the composition to a granule contact portion of a packaging machine, which is caused by static electricity or the like, is suppressed at the time of filling and packaging. Since the mean granule diameter is 5.0 mm or less, a decrease in the amount of oxygen absorbed per unit volume, which is caused by too large gaps among the granules, tends to be suppressed. In order to obtain an oxygen scavenger composition having a mean granule diameter in the above range, it is enough just to carry out sieving using, for example, sieves having openings of 0.3 mm and 2 mm. The mean granule diameter can be measured by, for example, a commercially available laser diffraction/scatting type particle size distribution measuring device (LA-960 manufactured by HORIBA, Ltd.).

The granule of the present embodiment preferably contains the α layer in an amount of 30% by mass or more and 50% by mass or less, the β layer in an amount of 49% by mass or more and 69% by mass or less, and the γ layer in an amount of 0.1% by mass or more and 5.0% by mass or less, based on the total amount (100% by mass) of the granule. Since the contents of the α layer, the β layer and the γ layer in the granule are in such ranges, moisture necessary for the oxidation reaction of iron is sufficiently supplied, and the amount of oxygen absorbed becomes larger. Moreover, containing of water unnecessary for the oxidation reaction of iron tends to be suppressed.

The bulk density of the oxygen scavenger composition is not specifically restricted, but is preferably 1.0 $g/cm^3$ or more, more preferably 1.3 $g/cm^3$ or more, still more preferably 1.5 $g/cm^3$ or more. Since the bulk density is 1.0 $g/cm^3$ or more, the amount of oxygen absorbed per unit volume tends to become more excellent. In order to obtain an oxygen scavenger composition having a bulk density in the above range, it is enough just to select granules having the desired bulk density by using, for example, specific gravity classifying equipment (high-speed aspirator manufactured by Tokyo Seifunki Mfg. Co., Ltd., or the like). The bulk density is measured by the method described in the working example that is described later.

[α Layer]

The α layer of the present embodiment is a layer containing a water retention agent, a swelling agent, a metal salt and water.

<Water Retention Agent>

The water retention agent of the present embodiment is a substance that is impregnated with water inside and can retain water without oozing of water. The water retention agent is, in itself, preferably in the form of granules. The water retention agent is not specifically restricted, and a porous substance or a highly water-absorbing resin generally obtainable can be used.

Examples of the porous substances include, but not particularly limited to, diatomaceous earth, zeolite, sepiolite, cristobalite, porous glass, silica, activated clay, acid clay, activated carbon, vermiculite and wood flour. As the porous substance, one or more selected from the group consisting of diatomaceous earth, silica and activated carbon are preferably contained. Examples of the highly water-absorbing resins include, but not particularly limited to, polyacrylate-based resins, polysulfonate-based resins, polyacrylamide-based resins, polyvinyl alcohol-based resins, starch-based resins, cellulose-based resins and polyalginic acid-based resins.

The above-described water retention agents can be used singly, or can be used in combination of two or more kinds when necessary. As these water retention agents, commercial products can also be easily obtained.

The mean particle diameter of the water retention agent is preferably 10 µm or more and 1000 µm or less, more preferably 100 µm or more and 500 µm or less. Since the mean particle diameter of the water retention agent is in the above range, the shape of the α layer is easily maintained, and more stable granules tend to be able to be formed.

The α layer contains the water retention agent preferably in an amount of 10% by mass or more and 80% by mass or less, more preferably 30% by mass or more and 60% by mass or less, based on the total amount (100% by mass) of the α layer. Since the content of the water retention agent is 10% by mass or more, the granules can sufficiently retain water, and the shape of the α layer tends to be easily maintained. Since the content of the water retention agent is 80% by mass or less, the proportion of the volume of the α layer in the oxygen scavenger composition does not become too high, and the amount of oxygen absorbed by the oxygen scavenger composition per unit volume tends to become larger.

<Swelling Agent>

The swelling agent of the present embodiment is swollen when it contains water, and has a caking function to keep the shape of the α layer. The swelling agent is not specifically restricted, and known swelling agents, binding agents, adhesives and binders, which are used for foods, etc., can be used.

Specific examples of the swelling agents include, but not particularly limited to, clay minerals, such as calcium bentonite, sodium bentonite and sodium montmorillonite; natural substances, such as defatted frozen bean curd, agar, starch, dextrin, gum arabic, gelatin and casein; semi-synthetic products, such as crystalline cellulose, carboxymethylcellulose, carboxymethylcellulose sodium, carboxymethylcellulose calcium, hydroxyethylcellulose, ligninsulfonic acid and hydroxyethylated starch; and synthetic products, such as water-insolubilized polyvinyl alcohol and polyvinyl methyl ether. Of these, one or more selected from the group consisting of carboxymethylcellulose calcium, carboxymethylcellulose sodium, calcium bentonite and sodium bentonite are preferably contained because they are inexpensive and have high caking power.

The above-described swelling agents can be used singly, or can be used in combination of two or more kinds when necessary. As these swelling agents, commercial products can also be easily obtained.

The mean particle diameter of the swelling agent is preferably 0.001 µm or more and 10 µm or less, more preferably 0.01 µm or more and 1.0 µm or less. Since the mean particle diameter of the swelling agent is 0.001 µm or more, rising-up of the swelling agent into air tends to be suppressed, and since the mean particle diameter is 10 µm or less, lowering of the function to cake the water retention agent particles tends to be suppressed.

The α layer contains the swelling agent preferably in an amount of 0.1% by mass or more and 20% by mass or less, more preferably 1.0% by mass or more and 10% by mass or less, based on the total amount (100% by mass) of the α layer. Since the content of the swelling agent is 0.1% by mass or more, the shape of the α layer is easily maintained, and since the content of the swelling agent is 20% by mass or less, the proportion of the water retention agent in the α layer does not become too low, the amount of moisture supplied to iron of the β layer is not decreased, and the amount of oxygen absorbed tends to become larger.

<Metal Salt>

The metal salt of the present embodiment catalytically acts on the oxidation reaction of iron contained in the β layer. The metal salt is not specifically restricted, but is preferably a metal halide from the viewpoint that the action and effect of the present invention are favorably exerted.

Metals in the metal halide salts are not specifically restricted, but for example, one or more selected from the group consisting of alkali metals, alkaline earth metals, copper, zinc, aluminum, tin, iron, cobalt and nickel can be mentioned, and more preferable are lithium, potassium, sodium, magnesium, calcium, barium and iron. Examples of halides in the metal halide salts include, but not particularly limited to, chlorides, bromides and iodides. More preferable are calcium chloride and sodium chloride because they are inexpensive and have high safety.

The above-described metal salts can be used singly, or can be used in combination of two or more kinds when necessary. As these metal salts, commercial products can also be easily obtained.

When an aqueous solution of the metal salt is used as a raw material, the concentration of the salt in the solution is preferably 5.0% by mass or more and 30% by mass or less, more preferably 10% by mass or more and 20% by mass or less. Since the concentration of the salt is 5.0% by mass or more, lowering of the action to catalyze the oxidation of iron is suppressed, and since the concentration of the salt is 30% by mass or less, lowering of the water vapor pressure can be suppressed. That is to say, the amount of evaporation of moisture is decreased, and a sufficient amount of moisture is not supplied to the iron of the β layer. In either case, a decrease in the amount of oxygen absorbed can be suppressed.

The α layer contains the aqueous solution of the metal salt preferably in an amount of 30% by mass or more and 70% by mass or less, more preferably 40% by mass or more and 60% by mass or less, based on the total amount (100% by mass) of the α layer. Since the content of the aqueous solution of the metal salt is 30% by mass or more, a sufficient amount of moisture tends to be supplied to the iron of the β layer. Since the content of the aqueous solution of the metal salt is 70% by mass or less, the water retention agent sufficiently retains water, and the water moves to the β layer to wet the surface of iron with water, whereby the contact of iron with oxygen tends to be not inhibited. In either case, the amount of oxygen absorbed tends to become larger.

[β Layer]

The β layer of the present embodiment is a layer containing iron. Iron may be contained as iron powder. The β layer may be a layer containing iron only, or may further contain an auxiliary in addition to iron.

<Iron>

The iron of the present embodiment is preferably contained as iron powder in the β layer. The iron power is not specifically restricted as long as the surface of iron is exposed.

The iron powder is not specifically restricted, but is preferably reduced iron powder, electrolytic iron powder or atomized iron powder. As other iron powders, ground products and cut products of cast iron, etc. can also be mentioned. Further, iron powder a surface of which has been covered with the same metal salt as the aforesaid metal salt is also employable. For example, iron powder covered with a metal halide can be prepared by mixing an aqueous solution of iron powder and the metal halide salt and then drying the solution to remove moisture.

The above-described irons can be used singly, or can be used in combination of two or more kinds when necessary. As these irons, commercial products can also be easily obtained.

The mean particle diameter of the iron powder is preferably 1.0 mm or less, more preferably 500 μm or less, still more preferably 100 μm or less, from the viewpoint that the contact of iron with oxygen is improved.

The β layer contains iron preferably in an amount of 80% by mass or more and 100% by mass or less, more preferably 90% by mass or more and 99.9% by mass or less, based on the total amount (100% by mass) of the β layer. Since the content of iron is 80% by mass or more, the amount of oxygen absorbed by the oxygen scavenger composition per unit volume tends to be more excellent.

<Auxiliary>

The auxiliary of the present embodiment has a function to prevent bonding of iron powder particles to one another occurring with oxidation, or a function to enhance fluidity of the oxygen scavenger composition to thereby facilitate filling of the oxygen scavenger composition when the composition is filled and packaged in a packaging material by a packaging machine.

Examples of the auxiliaries include powders of silica, hydrophobic silica, magnesium stearate, calcium stearate, activated carbon, zeolite, pearlite, diatomaceous earth, activated clay, kaolin, talc, bentonite, activated alumina, gypsum, silica alumina, calcium silicate, magnesium oxide, graphite, carbon black, aluminum hydroxide, iron oxide and the like.

As the above substances, commercial products can be easily obtained.

The mean particle diameter of the auxiliary is preferably 0.001 μm or more and 10 μm or less, more preferably 0.01 μm or more and 1.0 μm or less. Since the mean particle diameter is 0.001 μm or more, rising-up of the auxiliary into air is suppressed, and handling properties are enhanced. Since the mean particle diameter is 10 μm or less, bonding of the iron particles to one another tends to be suppressed.

[γ Layer]

The γ layer of the present embodiment is a layer containing a porous support.

<Porous Support>

The porous support of the present embodiment is not specifically restricted as long as it has a porous shape. Here, the term "porous" refers to a state in which a great number of pores of such a degree as can be confirmed by an electron microscope are present on the surface and in the inside.

As the porous support, the aforesaid porous substance used as the water retention agent can be appropriately used, but silicas are preferable. Silicas mean substances containing silicon dioxide ($SiO_2$) as a main component. By the use of silicas, the bulk density of the resulting granules is increased, and the amount of oxygen absorbed is increased.

Examples of the silicas for use in the present embodiment include, but not particularly limited to, hydrophobic silica, wet silica, dry silica, silica gel, diatomaceous earth, acid clay, activated clay, pearlite, kaolin, talc and bentonite.

The above-described porous supports can be used singly, or can be used in combination of two or more kinds when necessary. These porous supports can be easily obtained also as commercial products.

The γ layer contains the porous support preferably in an amount of 30% by mass or more, more preferably 50% by mass or more, still more preferably 80% by mass or more, based on the total amount (100% by mass) of the γ layer. Since the content of the porous support is in such a range, the bulk density of the resulting granules is increased, and the amount of oxygen absorbed tends to become larger.

[Production Process for Oxygen Scavenger Composition]

An example of a production process for the oxygen scavenger composition of the present embodiment is described below. Into a mixing device, the aforesaid water retention agent and swelling agent are introduced, and while mixing them, an aqueous solution of the metal halide salt is introduced over a period of a few tens of seconds to prepare granules serving as a raw material of the α layer. Here, examples of the mixing devices include a vertical granulator (manufactured by Powrex Corporation), a high-speed mixer (manufactured by EARTHTECHNICA Co., Ltd.) and a granulator manufactured by AKIRAKIKO Co., Ltd. Next, into the granules serving as a raw material of the α layer, iron powder is introduced, and they are mixed to allow the iron powder to adhere to the outside of the α layer, thereby preparing (α layer/β layer) granules each having an α layer and a β layer on the outside thereof. Further, into the (α layer/β layer) granules, hydrophobic silica is introduced, and they are mixed to allow the hydrophobic silica to adhere to the outside of the β layer, thereby preparing (α layer/β layer/γ layer) granules each having (α layer/β layer) and a γ layer on the outside thereof.

EXAMPLES

The present embodiment is described below in detail using examples and comparative examples, but the present embodiment can be appropriately modified as long as the action and effect of the present invention are exerted. Unless otherwise stated, the term "part(s)" in the examples and the comparative examples means part(s) by mass.

[Mean Granule Diameter]

The granule diameter of the oxygen scavenger composition was measured by a laser diffraction/scattering type particle size distribution measuring device (LA-960 manufactured by HORIBA, Ltd.). FIG. 1 is a view showing a granule size distribution of an oxygen scavenger composition of Example 1.

[Sectional Photograph]

A sectional photograph of an oxygen scavenger composition is obtained by cutting the composition with a cutter to prepare a section and photographing the section by a digital microscope (VHX-2000 manufactured by KEYENCE CORPORATION). FIG. 2 is a sectional photograph of an oxygen scavenger composition of Example 1.

Example 1

Into a high-speed mixer (SPG20L manufactured by EARTHTECHNICA Co., Ltd.), 1240 parts of diatomaceous earth (CG-2U manufactured by Isolite Insulating Products Co., Ltd.), 1120 parts of activated carbon (S-W50 manufactured by Futamura Chemical Co., Ltd.), 225 parts of calcium bentonite (Neo Kunibond manufactured by KUNIMINE INDUSTRIES CO., LTD.) and 20 parts of carboxymethylcellulose sodium (F350HC-4 manufactured by NIPPON PAPER Chemicals CO., LTD.) were introduced, and they were mixed at 240 r.p.m. for 30 seconds. Subsequently, while mixing the resulting mixture at 240 r.p.m., a sodium chloride aqueous solution obtained by dissolving 407 parts of sodium chloride (manufactured by DIASALT CORPORATION) in 2008 parts of water was introduced over a period of 30 seconds, and they were further mixed for 60 seconds, thereby obtaining granules serving as a raw material of an α layer.

Next, 6000 parts of iron powder (manufactured by Hoganas Japan K.K., mean particle diameter: 100 μm) were introduced and mixed at 240 r.p.m. for 3 minutes, thereby obtaining granules (α layer/β layer) in each of which a β layer had been formed on the outside of each of the granules serving as a raw material of an α layer. Moreover, 110 parts of hydrophobic silica (SS-30P manufactured by TOSOH SILICA CORPORATION) were introduced and mixed at 240 r.p.m. for 30 seconds, thereby obtaining an oxygen scavenger composition containing granules (α layer/β layer/γ layer) in each of which a γ layer had been formed on the outside of the granule (α layer/β layer). The mean granule diameter of the resulting oxygen scavenger composition was 0.9 mm (FIG. 1). The resulting granule (α layer/β layer/γ layer) had a structure having an α layer at the central part, having a β layer on the outside thereof and further having a γ layer on the outside thereof (FIG. 2).

In each step of the above process, the granules serving as a raw material of the α layer, the granules (α layer/β layer) and the granules (α layer/β layer/γ layer) were picked up and were used as a composition of Comparative Example 1, an oxygen scavenger composition of Comparative Example 2 and an oxygen scavenger composition of Example 1, respectively, to measure the following bulk density and amount of oxygen absorbed.

[Bulk Density]
The bulk density (g/cm³) of each of the resulting composition and oxygen scavenger compositions was measured in accordance with JIS Z 8901. The results are shown in Table 1.

[Amount of Oxygen Absorbed]
The amount of oxygen absorbed by each of the resulting oxygen scavenger compositions was measured in the following manner. In a gas barrier bag (size: 250×400 mm) made of a nylon/polyethylene laminated film, 1 g of the resulting oxygen scavenger composition was placed together with 3000 mL of air, and the bag was hermetically closed. This gas barrier bag was kept at 25° C. for 7 days, thereafter the oxygen concentration in the gas barrier bag was measured, and the amount of oxygen absorbed (mL) was calculated. The resulting amount of oxygen absorbed was divided by the volume (mL) of the oxygen scavenger composition to calculate an amount of oxygen absorbed per unit volume (mL/mL). The results are shown in Table 1.

Example 2

An oxygen scavenger composition containing granules (α layer/β layer/γ layer) were prepared in the same manner as in Example 1, except that the amounts of the raw materials used were changed to 700 parts of diatomaceous earth (CG-2U manufactured by Isolite Insulating Products Co., Ltd.), 1865 parts of water, 251 parts of sodium chloride (manufactured by DIASALT CORPORATION) and 100 parts of hydrophobic silica (SS-30P manufactured by TOSOH SILICA CORPORATION). With regard to the resulting oxygen scavenger composition, the bulk density and the amount of oxygen absorbed were measured. The results are shown in Table 1.

Comparative Example 3

By mixing 0.46 g of granules having been prepared in the same manner as in Example 1 and serving as a raw material of the α layer and 0.54 g of iron powder (manufactured by Hoganas Japan K.K., mean particle diameter: 100 μm) used in Example 1, 1 g of an oxygen scavenger composition was obtained. With regard to the resulting oxygen scavenger composition, the bulk density and the amount of oxygen absorbed were measured. The results are shown in Table 1.

TABLE 1

| | | Ex. 1 | Ex. 2 | Comp. Ex. 1 | Comp. Ex. 2 | Comp. Ex. 3 |
|---|---|---|---|---|---|---|
| Bulk density | g/cm³ | 1.50 | 1.45 | 0.80 | 1.20 | 1.20 |
| Amount of oxygen absorbed | mL/mL | 225 | 225 | 0 | 180 | 120 |

As shown in Table 1, it has been at least confirmed that the amount of oxygen absorbed by the oxygen scavenger composition of Example 1 per unit volume (mL/mL) was considerably enhanced as compared with any of the amounts of oxygen absorbed in Comparative Examples 1 to 3.

The present application is based on a Japanese patent application (Japanese Patent Application No. 2016-68607) filed with Japan Patent Office on Mar. 30, 2016, and the contents thereof are incorporated herein by reference.

INDUSTRIAL APPLICABILITY

When the oxygen scavenger composition according to the present invention is used, the amount of oxygen absorbed per unit volume increases without carrying out pressure molding. Moreover, when the oxygen scavenger composition is used, an oxygen scavenger which is in the form of a bag of smaller size than that for a conventional oxygen scavenger composition and exhibits the same performance as that of the conventional oxygen scavenger can be produced.

The invention claimed is:
1. An oxygen scavenger composition comprising a granule comprising:
    an α layer comprising a water retention agent, a swelling agent, a metal salt and water;
    a β layer consisting of iron in an amount of from 80% by mass to 100% by mass of the layer, with the balance being at least one auxiliary selected from the group consisting of powders of silica, hydrophobic silica, magnesium stearate, calcium stearate, activated carbon, zeolite, pearlite, diatomaceous earth, activated clay, kaolin, talc, bentonite, activated alumina, gypsum, silica alumina, calcium silicate, magnesium oxide, graphite, carbon black, aluminum hydroxide, iron oxide; and a γ layer comprising a porous support, wherein the granule forms a layer structure in order of the α layer, the β layer, and the γ layer from an inside to an outside of the granule, and wherein the α and γ layers do not include any of the auxiliaries contained in the β layer.

2. The oxygen scavenger composition according to claim 1, wherein the water retention agent comprises one or more selected from the group consisting of diatomaceous earth, silica and activated carbon.

3. The oxygen scavenger composition according to claim 1, wherein the swelling agent comprises one or more selected from the group consisting of carboxymethylcellulose calcium, carboxymethylcellulose sodium, calcium bentonite and sodium bentonite.

4. The oxygen scavenger composition according to claim 1, wherein the granule comprises the α layer in an amount of 30% by mass or more and 50% by mass or less, the β layer in an amount of 49% by mass or more and 69% by mass or less, and the γ layer in an amount of 0.1% by mass or more and 5.0% by mass or less, based on a total amount of the granule.

5. The oxygen scavenger composition according to claim 1, wherein the α layer contains the swelling agent in an amount of 1.0% by mass or more and 10% by mass or less, based on a total amount of the α layer.

6. The oxygen scavenger composition according to claim 1, wherein the β layer consists of more than 90% by mass iron.

7. The oxygen scavenger composition according to claim 6, wherein the β layer consists of more than 99.9% by mass iron.

* * * * *

UNITED STATES PATENT AND TRADEMARK OFFICE
CERTIFICATE OF CORRECTION

PATENT NO. : 11,077,424 B2
APPLICATION NO. : 16/086401
DATED : August 3, 2021
INVENTOR(S) : K. Sugimoto et al.

Page 1 of 1

It is certified that error appears in the above-identified patent and that said Letters Patent is hereby corrected as shown below:

In the Claims

Column 10, Line 66 Claim 1, change "the layer" to -- the β layer --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*